United States Patent Office 3,109,865
Patented Nov. 5, 1963

3,109,865
MANUFACTURE OF ALLYL ALCOHOL
Robert W. Foreman, Chagrin Falls, Ohio, assignor to The Standard Oil Company, Cleveland, Ohio, a corporation of Ohio
No Drawing. Filed Oct. 24, 1961, Ser. No. 147,170
10 Claims. (Cl. 260—638)

The present invention relates to a process for the manufacture of unsaturated alcohols from unsaturated aldehydes. More particularly, the process of the present invention is carried out by contacting the unsaturated aldehyde with cadmium metal in the presence of an acid. The invention is applicable to those unsaturated aldehydes containing from 3 to 8 carbon atoms such as acrolein, methacrolein, crotonaldehyde and the like. Since acrolein is commercially available, the invention will be described hereinafter with particular reference to that compound.

Several methods for converting acrolein to allyl alcohol have been suggested by the prior art. For example, British patent specification 734,247 discloses a process whereby acrolein may be converted to allyl alcohol by means of a vapor phase hydrogenation process. According to this patent, good yields of allyl alcohol are obtained when acrolein is treated with free hydrogen in the vapor phase at a temperature between 210° C. and 240° C. in the presence of a catalyst comprising cadmium and one or more heavy metals of groups I, II, VI and VIII of the periodic table. Relatively high pressures are employed in the process on the order of 20 to 50 kilograms per square centimeter. German Patent 858,247 discloses a somewhat different process which is also alleged to be useful for the conversion of acrolein to allyl alcohol. According to the German patent, good yields of allyl alcohol are obtained by reacting acrolein with free hydrogen in the presence of a catalyst containing cadmium oxide and a metal hydrogenating component which is preferably copper. The patent teaches that the best results are obtained when the process is operated at high pressures on the order of 100 to 300 atmospheres and at high temperatures. The process of the present invention is readily distinguished from all of the processes disclosed by the prior art in that it does not involve the direct treatment of acrolein with free hydrogen. Moreover, the process of the present invention is conducted under relatively mild conditions of temperature and pressure in contrast to the more severe process conditions taught by the prior art.

In brief, the process of the present invention is a liquid phase process which comprises the step of contacting a dilute solution of acrolein with cadmium metal in the presence of one or more acids. The principal products of this process are allyl alcohol and propionaldehyde but the ratio of allyl alcohol to propionaldehyde in the final product mix is usually at least three moles of allyl alcohol for each mole of propionaldehyde. Of course, both allyl alcohol and propionaldehyde may be recovered from the product mix by conventional means such as distillation. Unreacted acrolein and acid may also be recovered and recycled to the feed to the process.

The acids which have been found to be useful in the process of this invention are those acids which have an equivalent conductance in a 5% water solution at 15° C. of at least 100, and mixtures thereof. Equivalent conductance is defined as

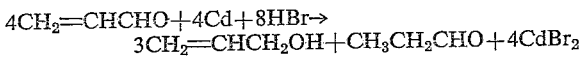

where mhos is defined as reciprocal ohms. Examples of such acids are hydroiodic, hydrobromic, hydrochloric, sulphuric acid and trifluoroacetic acid. Nitric acid and perchloric acid fall within this definition and yield allyl alcohol in satisfactory amounts, but consume additional cadmium because of their oxidizing character. Acids which have an equivalent conductance of less than 100, such as hydrofluoric acid and acetic acid have no appreciable activity in the process of this invention.

The chemical reaction which occurs in the process of this invention has not been definitely established but it may be represented by the following formula when the acid is HBr:

$4CH_2\!=\!CHCHO + 4Cd + 8HBr \rightarrow$
$\qquad 3CH_2\!=\!CHCH_2OH + CH_3CH_2CHO + 4CdBr_2$ As is apparent from the foregoing formula, cadmium metal is converted to the corresponding salt in the process of this invention. This salt will of course vary with the acid employed. Cadmium metal may be regenerated from the cadmium salt for reuse in the process by well-known methods, but these methods form no part of the present invention. The products of the process; namely, allyl alcohol and propionaldehyde, are recovered from the reaction mixture by conventional means such as by distillation.

The process is carried out in a reaction vessel which should be acid-resistant but is otherwise conventional. The process may be carried out in either a batch or continuous operation and the choice of the method of operation will be controlled to a large extent by the economics of the particular situation.

As has been pointed out above, the mechanism by which allyl alcohol is formed from acrolein in the process of this invention has not been finally established. However, it is postulated, based on the available evidence, that cadmium forms some type of chemical complex with acrolein and that it is this complex which serves as an intermediate in the formation of the allyl alcohol. It is further postulated that the so-called acrolein-cadmium complex reacts with the protons available in the reaction mixture to form the allyl alcohol. In support of this theory, the fact that no evolution of hydrogen in the reaction mixture is observed during the course of the reaction would seem to be especially cogent.

One of the more surprising aspects of this invention is the unique influence which cadmium metal exerts on the conversion of acrolein to allyl alcohol. A number of other metals were screened for activity in this reaction and none were found to be satisfactory. Metals such as magnesium, iron and lead exhibited little or no activity. Zinc exhibited some activity but it is unsuitable because it causes the evolution of molecular hydrogen. Furthermore, it has been observed that if cadmium is combined with other metals such as copper and mercury, the results are poorer than those obtained when cadmium per se is employed. Consequently, it is quite clear that cadmium metal is unique insofar as the present invention is concerned.

The critical variables in the operation of the process of this invention are: (1) the ratio of acrolein to acid, (2) the reaction temperature, (3) the ratio of cadmium to acrolein and (4) the concentration of acrolein in the reaction mixture.

As for the ratio of acrolein to acid, any molar ratio in the range of 0.0001 to 0.5 is operable. However, a molar ratio in the range of 0.01 to 0.25 appears to give the best results.

The temperature at which the reaction is carried out may vary in the range of about 110° C. to about 0° C. and the preferred temperature range is about 30° C. to about 90° C. In general, the reaction is quite rapid at the higher temperatures in this range and reaction times on the order of 5 seconds to 40 minutes appear to be adequate in almost all cases for the completion of the reaction. The process is usually conducted at or near atmospheric pressure and pressure is required only when operating at the upper end of the temperature range in order to maintain the reaction mixture in the liquid phase.

It will be noted from the formula given above that one gram-atom of cadmium metal is necessary for each mole of acrolein which is reacted and for the best results a stoichiometric excess of cadmium should be employed in the reaction mixture. However, the form in which the cadmium metal is present in the reaction mixture is in no way critical. For example, the cadmium may be present as a sheet of metal or it may be present in the forms of powder, chips or turnings. Of course, the larger the surface area, the shorter the reaction time.

In order to achieve the optimum results in the process of this invention, it is important that the concentration of acrolein in the reaction mixture be kept rather low, preferably below about 5 mol percent. One way to accomplish this objective is to add the acrolein gradually to the reaction mixture so that it will be reacted almost as rapidly as it is added. However, regardless of the exact manner in which the acrolein is added to the reaction mixture, it should be added in the form of a dilute solution (not more than about 5 mol percent acrolein). Solutions containing less than 0.025 mol percent acrolein, while operable, offer no advantage in the process. Any unreactive liquid in which acrolein is soluble may be employed as the solvent. A particularly suitable solvent is water and it is the preferred solvent. Mixtures of water and other materials such as glycols, surface active agents, etc. may also be employed as the solvent.

The process of this invention may be illustrated by a number of specific examples which now follows:

EXAMPLE 1

In order to illustrate the results obtained when hydrogen bromide is employed as the acid in the process of this invention, a solution was prepared which had the following composition:

Ingredient: Mol percent
 Acrolein _____ 0.94
 Hydrogen bromide _____ 4.71
 Water _____ 94.35

This solution was pumped into a U-tube reactor containing a stoichiometric excess of cadmium metal in the form of chips at a rate of 2 milliliters per minute which gave a contact time of 10 minutes. The reaction was carried out at a temperature of 80° C. Analysis of the reactor effluent revealed that 68.9% of the acrolein fed was converted to allyl alcohol while 16.0% of the acrolein fed was converted to propionaldehyde. Overall 95.7% of the acrolein fed to the reactor was converted.

In another series of experiments the efficacy of various acids was compared. In each of these experiments the reaction mixture had the following initial composition:

Ingredient: Mol percent
 Acrolein _____ 0.49
 Acid _____ 1.95
 Water _____ 97.56

In all of these experiments a batch reactor was employed. About 10 milliliters of the feed solution and 10 grams of cadmium metal chips were employed in each experiment. All experiments were conducted at about 20° C. and at a contact time of 30 minutes with agitation of the reactor during the course of the experiment. The results are reported in the following table:

Table I

| Example | Acid | Equivalent Conductance [3] | Percent Acrolein Converted to Allyl Alcohol | Percent Acrolein Converted to Propionaldehyde |
|---|---|---|---|---|
| 2 | hydroiodic | 328.9 | 72.9 | 20.8 |
| 2(a) | hydroiodic [1] | 328.9 | 79.0 | 19.5 |
| 3 | hydrobromic | 209.5 | 48.7 | 13.5 |
| 4 | hydrochloric | 281.0 | 38.7 | 16.9 |
| 5 | sulphuric | 198.0 | 29.2 | 12.7 |
| 6 | trifluoroacetic | 100 | 18.1 | 4.8 |
| 7 | perchloric [2] | 100 | 23.2 | 7.7 |
| 8 | hydrofluoric | 24.3 | 3.9 | |
| 9 | acetic | 5.0 | 1.0 | |

[1] 80° C. instead of 20° C.
[2] 30° C. instead of 20° C.
[3] As defined above.

It is apparent from a consideration of the data in the preceding table that under the given conditions, hydrogen iodide gives the best results. Examples 8 and 9 are outside of the present invention and appear merely for purposes of comparison.

In still another series of experiments, the effect of employing a mixture of acids was evaluated. In these experiments the acrolein was introduced to the reaction mixture in the form of an aqueous solution containing about 0.5 mol percent of acrolein. A batch reactor was employed and it contained about 10 grams of cadmium chips. All of the experiments were conducted at 80° C. and a reaction time of 30 minutes. In each experiment about 10 milliliters of the acrolein solution was used. The data are reported in the following table:

Table II

| Example | Mol Ratio, Acid to Acrolein | Percent Per Pass Conversion of Acrolein To— | |
|---|---|---|---|
| | | Allyl Alcohol | Propionaldehyde |
| 10 | H$_2$SO$_4$—8 / HI—0.1 | 82.5 | 18.2 |
| 11 | H$_2$SO$_4$—8 / HBr—0.1 | 36.8 | 9.6 |
| 12 | H$_2$SO$_4$—8 / HCl—0.1 | 45.2 | 14.1 |
| 13 | H$_2$SO$_4$—8 / HNO$_3$—0.1 | 34.8 | 9.4 |
| 14 | HBr—6 / HNO$_3$—0.1 | 72.5 | 19.1 |

It will be appreciated from the data in Table II that a mixture of acids may be particularly advantageous in the present process. For example, a mixture of sulfuric and hydroiodic acids make possible very nearly complete conversion of acrolein to useful products as shown by Example 10.

EXAMPLE 15

In order to illustrate the results obtained when methacrolein is employed as the unsaturated aldehyde in the process of this invention, a solution was prepared which had the following composition:

Ingredient: Mol percent
 Methacrolein _____ 0.94
 Hydrogen bromide _____ 4.71
 Water _____ 94.35

This solution was pumped into a U-tube reactor containing a stoichiometric excess of cadmium metal in the form of chips at a rate of 2 milliliters per minute which gave a contact time of 10 minutes. The reaction was carried out at a temperature of 80° C. Analysis of the reactor effluent revealed that 78.7% of the methacrolein fed was converted to methallyl alcohol while 17.4% of the methacrolein fed was converted to isobutyraldehyde.

EXAMPLE 16

In order to illustrate the results obtained when crotonaldehyde is employed as the unsaturated aldehyde in the process of this invention, a solution was prepared which had the following composition:

| Ingredient: | Mol percent |
|---|---|
| Crotonaldehyde | 0.94 |
| Hydrogen bromide | 4.71 |
| Water | 94.35 |

This solution was pumped into a U-tube reactor containing a stoichiometric excess of cadmium metal in the form of chips at a rate of 2 milliliters per minute which gave a contact time of 10 minutes. The reaction was carried out at a temperature of 80° C. Analysis of the reactor effluent revealed that 29.8% of the crotonaldehyde fed was converted to crotyl alcohol while 7.0% of the crotonaldehyde fed was converted to n-butyraldehyde.

Various modifications of the process described herein will undoubtedly occur to those skilled in the art and this application for Letters Patent is intended to cover all such modifications as would reasonably fall within the scope of the appended claims.

I claim:

1. The process for the manufacture of unsaturated alcohols from unsaturated aldehydes comprising contacting an aqueous solution containing less than about 5 mole percent of a member selected from the group consisting of acrolein, methacrolein and crotonaldehyde with cadmium metal in the presence of an acid having an equivalent conductance of at least 100 at a temperature in the range of about 0° C. to about 110° C.

2. A process for the manufacture of allyl alcohol comprising contacting a dilute liquid solution of acrolein with cadmium metal in the presence of an acid having an equivalent conductance of at least 100 at a temperature in the range of about 0° C. to about 110° C., said solution containing less than about 5 mol percent of acrolein.

3. A process for the manufacture of allyl alcohol from acrolein comprising contacting an aqueous solution containing less than about 5 mol percent of acrolein with cadmium metal in the presence of an acid having an equivalent conductance of at least 100 at a temperature in the range of about 0° C. to about 110° C.

4. The process of claim 3 in which said acid is hydroiodic acid.

5. The process of claim 3 in which said acid is hydrobromic acid.

6. The process of claim 3 in which said acid is hydrochloric acid.

7. The process of claim 3 in which said acid is sulfuric acid.

8. The process of claim 3 in which said acid is trifluoroacetic acid.

9. A process for the manufacture of allyl alcohol from acrolein comprising contacting an aqueous liquid solution containing less than about 5 mol percent acrolein with cadmium metal in the presence of a mixture of acids each of which has an equivalent conductance of at least 100 at a temperature in the range of about 0° C. to about 110° C.

10. The process of claim 9 in which said acid mixture comprises sulfuric acid and hydroiodic acid.

References Cited in the file of this patent

UNITED STATES PATENTS

| 1,688,083 | Lommen | Oct. 16, 1928 |
| 2,009,948 | Schmidt et al. | July 30, 1935 |
| 2,763,696 | Finch et al. | Sept. 18, 1956 |

OTHER REFERENCES

Hickinbottom: Reactions of Organic Compounds, Longmans, Green and Co., 1948, pages 151–155.

Adams et al.: Organic Reactions, vol. I, John Wiley & Son Inc., 1954, page 156.

Kendall: Smith's Introductory College Chemistry, 1938, D. Appleton-Centrury Co., 1938, page 485.

Gmelin's Hanbuch der Anorganischen Chemie, Cadmium, SN 33, Verlag Chemie, GMBA, 1959, pages 325, 326, 331.